United States Patent
Lane et al.

(10) Patent No.: US 6,693,441 B2
(45) Date of Patent: Feb. 17, 2004

(54) CAPACITIVE FINGERPRINT SENSOR WITH PROTECTIVE COATING CONTAINING A CONDUCTIVE SUSPENSION

(75) Inventors: Fred P. Lane, Denton, TX (US);
Giovanni Gozzini, Berkeley, CA (US);
Harry M. Siegel, Hurst, TX (US)

(73) Assignee: STMicroelectronics, Inc., Carrollton, TX (US)

( * ) Notice: Subject to any disclaimer, the term of this patent is extended or adjusted under 35 U.S.C. 154(b) by 31 days.

(21) Appl. No.: 10/000,174

(22) Filed: Nov. 30, 2001

(65) Prior Publication Data

US 2003/0102874 A1 Jun. 5, 2003

(51) Int. Cl.[7] .................. G01R 27/26; A61B 5/117; B05D 5/12
(52) U.S. Cl. .................. 324/662; 324/686; 324/690; 427/10; 427/1; 427/7; 427/8
(58) Field of Search .................. 324/662, 663, 324/686, 690, 681; 427/10, 1, 8, 7, 79; 148/251; 257/532, 642, 643; 438/48; 382/124

(56) References Cited

U.S. PATENT DOCUMENTS

| | | | |
|---|---|---|---|
| 4,394,773 A | * 7/1983 | Ruell | 382/124 |
| 5,254,633 A | * 10/1993 | Han et al. | 525/327.4 |
| 5,578,527 A | * 11/1996 | Chang et al. | 156/273.9 |
| 6,114,862 A | 9/2000 | Tartagni et al. | 324/662 |
| 6,326,227 B1 | 12/2001 | Thomas et al. | 438/48 |
| 6,346,739 B1 | 2/2002 | Lepert et al. | 257/532 |
| 6,478,976 B1 | * 11/2002 | Lepert et al. | 216/18 |
| 6,501,284 B1 | * 12/2002 | Gozzini | 324/681 |

OTHER PUBLICATIONS

Young et al., "Novel Fingerprint Scanning Arrays Using Polysilicon TFT's on Glass and Polymer Substrates", IEEE Electron Device Letters, vol. 18, No. 1, Jan. 1997, pp. 19–20.*

* cited by examiner

Primary Examiner—Anjan K. Deb
(74) Attorney, Agent, or Firm—Lisa K. Jorgenson; Peter J. Thoma

(57) ABSTRACT

A capacitive fingerprint sensor includes a polymeric protective coating defining a sensing surface and having conductive particles suspended therein. The conductive particles act as parallel strings of series capacitors to couple the capacitance the fingerprint-bearing skin of a user's finger applied to the sensing surface to capacitive sensing elements beneath the protective coating. The polymeric material of the coating is durable and scratch resistant. The conductive particles enable use of a protective coating of 10 to 20 microns in thickness while providing a high degree of sensitivity and image resolution.

30 Claims, 2 Drawing Sheets

CAPACITIVE FINGERPRINT SENSOR WITH PROTECTIVE COATING CONTAINING A CONDUCTIVE SUSPENSION

BACKGROUND OF THE INVENTION

The present invention relates generally to protective coatings for semiconductor devices, and more particularly to the surface structure of solid-state fingerprint sensors.

A capacitive fingerprint sensor is disclosed in commonly-assigned U.S. Pat. No. 6,114,862 by Tartagni et al., the disclosure of which is hereby incorporated by reference. The Tartagni et al. patent discloses a two-dimensional array of capacitive sensor cells or "pixel" cells. The array includes a dielectric layer that forms a sensing surface for contact with the fingerprint-bearing skin of a user's finger. Capacitor plates at each pixel location beneath the dielectric layer distinguish between the presence of fingerprint ridges and valleys above the sensing surface during a fingerprint sensing operation.

The dielectric layer that forms the sensing surface in prior art fingerprint sensors, such as that disclosed in the Tartagni et al. patent, is typically an ultra-hard material that is resistive to wear from repeated use. One example of an ultra-hard dielectric material used in prior art fingerprint sensors is a layer of silicon carbide. It has been found that such ultra-hard dielectric layers can be damaged by impact with sharp instruments, such as the point of a ballpoint pen. Although it is impractical to design a product that will survive intentional destructive misuse, it is desirable to design a product that will survive occasional accidental misuse. Therefore, it would be desirable to find a material for use as a protective coating for a fingerprint sensor that is durable with normal expected use, resistive to occasional accidental misuse, and effective in permitting accurate sensing of a fingerprint of a finger applied to a sensing surface.

SUMMARY OF THE INVENTION

The present invention provides a protective coating for a fingerprint sensor that comprises a polymeric material with conductive particles suspended therein. The protective coating has an exposed upper surface for contact with the fingerprint-bearing skin of a user's finger. The protective coating is durable and resistive to damage from scratching or impact from a sharp or pointed object. The protective coating is applied to an underlying hard dielectric body that includes capacitive sensing plates embedded therein. The conductive particles suspended in the protective coating are generally uniformly distributed and are smaller than the thickness of the protective coating so that they define parallel strings of series capacitors between the upper sensing surface of the protective coating and the capacitive sensing plates disposed beneath the protective coating at each pixel location.

BRIEF DESCRIPTION OF THE DRAWINGS

For a more complete understanding of the present invention and the advantages thereof, reference is now made to the following description taken in conjunction with the accompanying drawings, in which.

DESCRIPTION OF THE PREFERRED EMBODIMENTS

Figure 1:
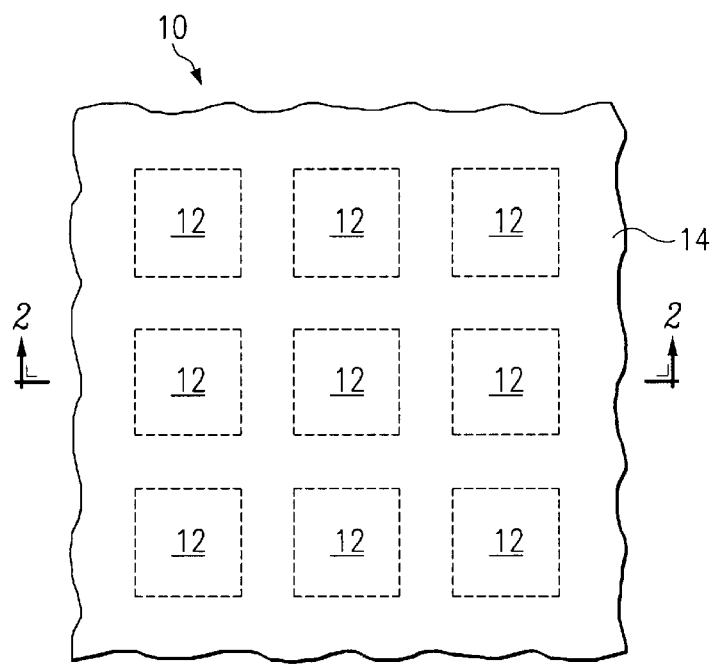
FIG. 1 is a partial plan view of a fingerprint sensor device schematically illustrating the layout of capacitive sensing elements at pixel locations within the device.

Referring to FIG. 1, a portion of an array 10 of sensing elements 12 is shown defining pixel locations within a fingerprint sensor device. The sensing elements 12 are arranged in rows and columns of sufficient number to create an image of a fingerprint. The sensing elements 12 are disposed beneath a sensing surface 14 to which the fingerprint-bearing skin of a user's finger is applied during a sensing operation. Preferably, the sensing elements 12 are arranged with a center-to-center spacing of about 50 microns, column-to-column and row-to row, throughout the array 10.

Figure 2:
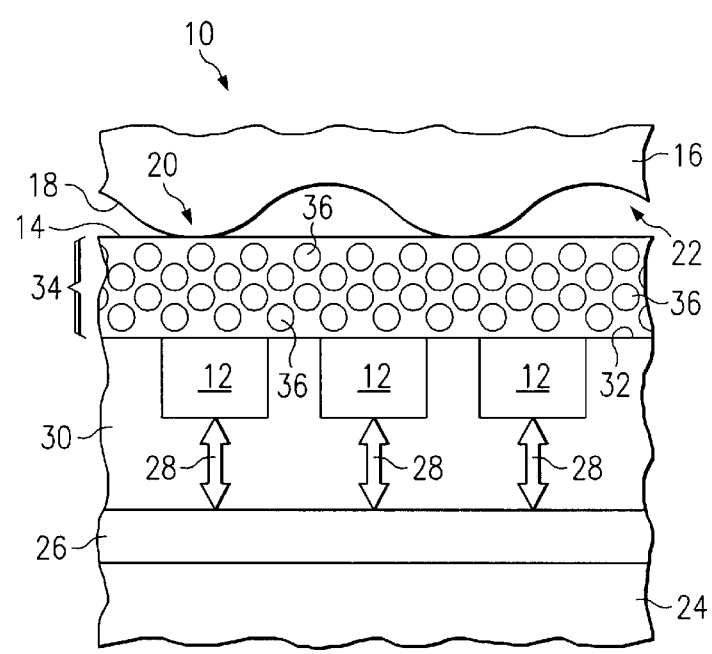
FIG. 2 is a schematic vertical cross-section of the device of FIG. 1 taken along line 2—2 of FIG. 1.

Referring to FIG. 2, the cross-sectional structure of a portion of the pixel array 10 is shown schematically in relationship to a user's finger 16. The finger 16 has fingerprint-bearing skin 18 that includes ridges 20 and valleys 22, which are common characteristics of human fingerprints but are uniquely patterned for each individual. The ridges 20 are shown in contact with the sensing surface 14, and the valleys 22 are spaced just above the sensing surface 14.

The fingerprint sensor of which the array 10 is a part is formed on a semiconductor substrate 24, which may consist essentially of monocrystalline silicon doped to a specified resistivity. An epitaxial layer 26 is formed atop the substrate 24 and is considered part of the substrate 24. Active circuitry, which may consist mainly of interconnected MOS transistors (not shown), is formed in the epitaxial layer 26 using conventional semiconductor manufacturing techniques. An example of suitable active circuitry formed in the epitaxial layer 26 is described below with reference to FIG. 5.

The sensing elements 12 communicate with the active circuitry in the epitaxial layer 26 through conductive paths 28, depicted generally in FIG. 2. The sensing elements 12 and conductive paths 28 are formed in a composite dielectric body 30, which typically includes multiple layers of oxide, nitride or other conventional dielectric materials used in semiconductor device fabrication. The composite dielectric body 30 has an upper surface 32. The sensing elements 12 extend to the upper surface 32 from a depth therebelow. Disposed atop the upper surface 32 of the composite dielectric body 30 is a protective coating 34 that includes multiple conductive particles 36 suspended therein.

Figure 3:
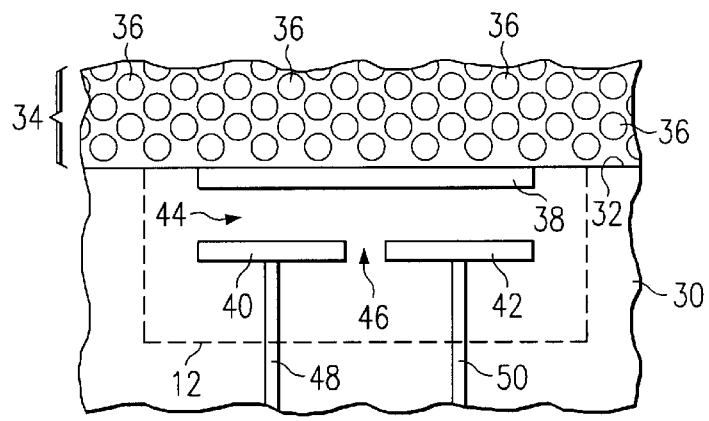
FIG. 3 is an enlarged view of a portion of FIG. 2 showing one possible arrangement of capacitor plates within a sensing element.

Referring to FIG. 3, one possible implementation of the sensing elements is shown. The sensing element 12 preferably is a capacitive sensing element. In the particular embodiment shown, the capacitive sensing element 12 includes an upper capacitor plate 38 lying at the upper surface 32 of the composite dielectric body 30. The sensing element 12 further includes a first lower capacitor plate 40 and a second lower capacitor plate 42, which are coplanar and are arranged beneath the upper plate 38 to define respective first and second capacitors therewith. A thin dielectric layer 44, which is a portion of the composite dielectric body 30, separates the upper capacitor plate 38 from the first and second lower capacitor plates 40 and 42. The thin dielectric layer 44 is preferably from 0.2 to 0.3 microns thick and may comprise silicon nitride, phosphosilicate glass or other such commonly used dielectric materials. A narrow gap 46 is formed between the facing edges of the lower plates 40 and 42. The gap 46 is about 1 to 2 microns wide and is filled with dielectric material.

Apart from the gap 46, the first and second lower plates 40 and 42 preferably occupy an area that corresponds to and is juxtaposed beneath the upper plate 38. Such an arrangement advantageously minimizes the parasitic capacitance between the upper plate 38 and ground. Conductors 48 and 50 connect respective plates 40 and 42 to the active circuitry in the epitaxial layer 26 of the substrate 24. The conductors 48 and 50 correspond to one of the conductive paths 28 described above with reference to FIG. 2.

It will be appreciated that all sensing elements 12 of the array 10 will be similarly structured, and that the particular structure for the capacitive sensing element 12 of FIG. 3 is but one of various alternative structures that can be employed to give effect to the invention. Also, the upper plate 38 need not be in direct contact with the protective coating 34. For example, the structure could include a very thin polymeric layer (for example, less than 2 microns thick) between the surface 32 and the protective coating 34, the very thin polymeric layer serving as a second protective coating. This second very thin protective coating would be essentially free of conductive particles and would be permanently affixed to the surface 32 to protect the composite dielectric body 30 and sensing elements 12. In such an alternative, the protective coating 34 with suspended conductive particles 36 therein could be replaced if damaged or after excessive wear. This would permit extending the useful life of the fingerprint-sensing device.

The plates 38, 40, and 42 maybe made from conventional metal layers, which are typically aluminum, deposited at two different levels during fabrication of the device. Other conductive materials can be used. For example, plate 38 can comprise titanium oxide or a titanium oxide layer atop an aluminum layer. Rather than aluminum, plates 40 and 42 can be formed from a conductive polysilicon layer, such as silicided polysilicon. Also, the areas shared by the plate 38 and the underlying plates 40 and 42 are sufficiently large that the two capacitors they form each has a much greater capacitance than the capacitor formed between the facing edges of lower plates 40 and 42.

The protective coating 34 preferably comprises a fluoropolymer that is durable and scratch resistant. Various fluoropolymers are well suited for this application. In particular, DuPont sells fluorinated ethylene propylene coatings under its brand Teflon® FEP, which are highly hydrophobic and oleophobic, and therefore inhibit retention of fingerprints from skin oil on the sensing surface 14. Successful experiments have been performed using a DuPont coating type 958-203, which is a fluoropolymer containing carbon black particles.

Suspended within the protective coating are conductive particles 36 of conductive material or metal, which preferably are generally spherical in shape, although other shapes can function effectively. Suitable materials for the conductive particles include carbon, graphite, silicon, aluminum, copper and silver. It is known from analysis of DuPont coating type 958-203 that carbon in the form of carbon black particles can be generally uniformly distributed within a fluoropolymer coating. The particles 36 can comprise conductive crystals, such as doped silicon microcrystals. Other conductive materials may be employed. Additionally, the conductive particles 36 can each comprise a particle having a conductive core with a thin outer dielectric coating. For example, the conductive particles 36 can be balls of aluminum, each having a thin aluminum oxide film defining an exterior surface.

A preferred thickness for the protective coating 34 is from 10 to 20 microns. Such a thickness is desirable, not only for its manufacturability and its stress-spreading capability, but also for good image sensitivity and resolution. Preferably, to achieve good image sensitivity and resolution, the thickness of the protective coating 34 should not exceed one-half of the center-to-center spacing between sensing elements 12 of the array 10.

The protective coating 34 with the conductive particles 36 generally uniformly distributed therein can be applied at the final stage of conventional wafer fabrication. Wafers having multiple sensor devices formed on a common substrate can be prepared by masking off bonding pads on the device surfaces, spraying on the protective coating, allowing the coating to harden, slicing the wafer into chips, uncovering the bonding pads, mounting each chip in protective housing or "package," wire bonding the chip's bonding pads to terminals within the package, and sealing the package leaving the sensing surface exposed. Similar techniques are commonly practiced in semiconductor device manufacturing.

The conductive particles 36 should be generally uniform in size and be significantly smaller in diameter (or largest dimension for non-spherical particles) than the thickness of the protective coating 34. For example, for a protective coating 34 that is 15 microns thick, the conductive particles 36 should have diameters typically of about 5 microns. That is, the diameter or largest dimension the conductive particles 36 ideally should be about one-third the thickness of the protective coating 34. It is not necessary that all such particles 36 be approximately the same size, but best results will be achieved if the larger particles have diameters or largest dimensions that do not exceed one-half of the thickness of the protective coating 34. It is believed that best results will be achieved if more than 90 percent of the particles 36 are sized such that their largest dimension is from one-fourth to one-third of the thickness of the protective coating 34.

Figure 4:
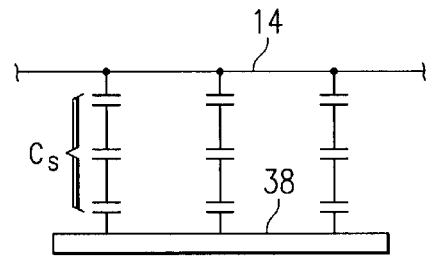
FIG. 4 is a schematic equivalent circuit of parallel strings of series capacitors interconnecting a sensing surface and a sensing plate of one pixel of the device.

Now referring to FIG. 4, the electrical effect of the suspended conductive particles 36 will be described. FIG. 4 shows a simplified equivalent circuit that includes a plurality of capacitors arranged in series strings, many such strings being arranged in parallel per pixel. Although three strings of three capacitors each are shown for the pixel corresponding to the plate 38, generally there will be many more such strings, and there may be more or less than three capacitors per string at each pixel location. The capacitor strings extend from the upper capacitor plate 38 (seen in FIG. 3) to the sensing surface 14 (seen in FIG. 2). The capacitors in FIG. 4 are formed by the conductive particles 36 shown in FIGS. 2 and 3. From an electrical viewpoint, the upper plate 38, the conductive particles 36 disposed thereover, and the sensing surface 14 form a sensing capacitor $C_s$. The conductive particles 36 have the electrical effect of making the sensing surface 14 appear much closer to the upper plate 38 than the actual separation distance between them. The capacitance of capacitor $C_s$ varies with the characteristics of the fingerprint-bearing skin 18 applied to the sensing surface 14 immediately above the upper plate 38 of each pixel. The capacitance is greater when a ridge 20 rather than a valley 22 is present at the sensing surface 14 over a particular sensing element 12.

Figure 5:
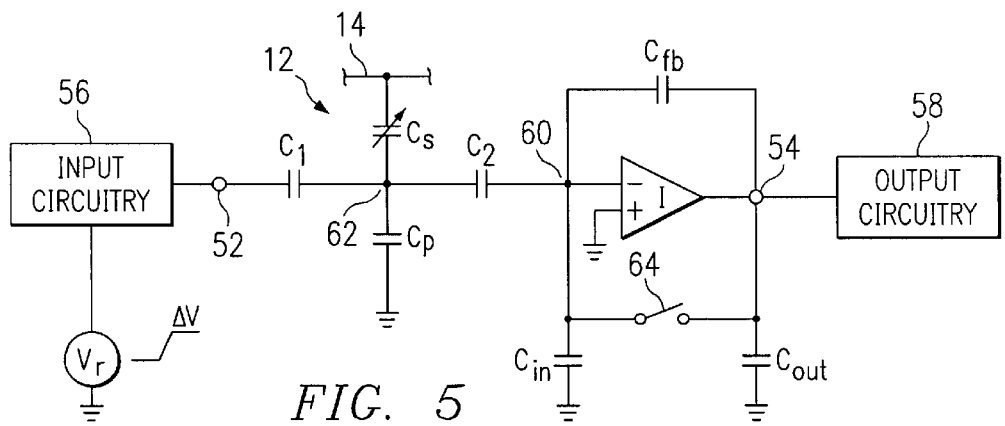
FIG. 5 is a circuit diagram of one embodiment of a pixel and sensing circuitry in accordance with the present invention.

Referring to FIG. 5, an implementation of the active circuitry for the inventive sensing elements 12 will be described. The circuitry dedicated to one pixel includes an input node 52, an output node 54, and the circuit elements therebetween. Input circuitry 56 selectively connects the input node 52 to a reference voltage source $V_r$. The output node 54 is connected to output circuitry 58 that senses output signals from the pixel periodically.

The output of the pixel at node 54 is generated by an inverting amplifier or charge integrator I, which is similar to the inverting amplifier of U.S. Pat. No. 6,114,862 with a different feedback arrangement, as described below. The charge integrator I integrates the charge appearing at its negative (−) input and generates a corresponding amplified analog output. Series connected capacitors $C_1$ and $C_2$ interconnect the pixel's input node 52 with a node 60 that corresponds to the charge integrator's negative (−) input. The charge integrator's positive (+) input is connected to a voltage source such as ground. The connection between capacitors $C_1$ and $C_2$ defines an electrically floating node 62 that also defines a point of connection between capacitors $C_s$ and $C_p$. Capacitor $C_p$ represents the parasitic capacitance that exists between the floating node 62 and the ground node. The ground symbols in FIG. 5 may represent the actual ground terminal of the fingerprint sensing device or may represent a virtual ground bus internal to the chip.

Comparing FIG. 5 to FIG. 3, capacitor $C_1$ is formed by plate 40 and the portion of plate 38 lying thereover, and capacitor $C_2$ is formed by plate 42 and the portion of plate 38 lying thereover. Capacitor $C_s$ is the pixel's sensing capacitor that is formed between the upper plate 38 and the sensing surface 14 (seen in FIG. 2). The capacitance of capacitor $C_s$ varies with the presence of ridges and valleys of the skin of the user's finger applied to the sensing surface 14 during a sensing operation. Just prior to a sensing operation, a reset switch 64 (seen in FIG. 5) is opened to prepare the charge integrator I to generate an accurate output signal during the sensing operation. The reset switch 64 may be a conventional transistor, such as an NMOS transistor, and interconnects the charge integrator's input node 60 and output node 54.

Referring again to FIG. 5, a feedback capacitor $C_{fb}$ is included in the circuit and couples the charge integrator's output node 54 to its input node 60. The device designer can select the capacitance value of feedback capacitor $C_{fb}$ to tune the gain of the charge integrator I to a predetermined desired level. Capacitor $C_{fb}$ may be formed in any suitable manner, and may comprise, for example, metal plates at two different levels, or a metal plate disposed over a conductive polysilicon layer, or a conductive polysilicon layer disposed over a heavily-doped surface region in the epitaxial layer 26 of the substrate 24. In whatever form, the capacitor $C_{fb}$ should have a predetermined value maintained within a tight tolerance.

Additionally, capacitor $C_{in}$ is connected between the charge integrator's input node 60 and ground, and capacitor $C_{out}$ is connected between the charge integrator's output node 54 and ground. These two additional capacitors represent parasitic capacitances, but their presence in the circuit does not affect the gain of the charge integrator I. The gain of the charge integrator I is a function of fixed-value capacitors $C_1$, $C_2$, $C_{fb}$, and $C_p$ as well as variable capacitor $C_s$.

The pixel of FIG. 5 can be considered as having two stages: a capacitive sensing stage comprising capacitors $C_s$, $C_1$, $C_2$, and $C_p$; and an amplifier stage comprising the charge integrator I, feedback capacitor $C_{fb}$, reset transistor switch 64, and the parasitic capacitors $C_{in}$ and $C_{out}$. The reference voltage source $V_r$, input circuitry 56, and the output circuitry 58 are shared by the various pixels of the fingerprint sensor array.

In operation, the pixel is periodically interrogated or "read" in a sequence that individually interrogates each pixel in the entire array of similar such pixels. The array 10 can be addressed in a way similar to the way a random access memory chip is addressed, using row and column decoders. Address decoder circuitry (not shown) can select individual pixels for interrogation one at a time in a predetermined sequence. The pixel takes its turn in the addressing sequence when an input pulse signal $\Delta V$ generated by reference voltage source $V_r$ is applied to capacitor $C_1$. The pulse $\Delta V$ propagates through the series-connected capacitors $C_1$ and $C_2$ to node 60, where it appears as a transient increase in charge that is input to the charge integrator I. The charge integrator's output signal at node 54 is the product of the reference voltage input pulse $\Delta V$ and the gain of the charge integrator I. When the output of the pixel is detected by the output circuitry 58 during the array interrogation sequence, the output circuitry 58 creates a digitized value of the analog output appearing at node 54. It will be appreciated that the output circuitry 58 will include an analog-to-digital converter (not shown) for converting the analog pixel outputs to digital signals for output off the chip for processing by a system processor or computer.

Each individual pixel of the sensing array typically occupies an area of about 50 microns by 50 microns. In a typical fingerprint sensor, the entire sensing surface of which surface 14 is a part is rectangular and has dimensions of 12.8 mm by 18.0 mm. Thus, there may be over 90,000 pixels in a typical fingerprint sensor, which enables a very high resolution of the digitized fingerprint image to be achieved. Since an individual pixel can be addressed and its output read in less than a microsecond, an entire fingerprint image can be captured in less than one-tenth of a second. Each of the digitized values of the pixel outputs can be stored in a memory or compared to previously stored fingerprint data in memory. A gray scale image of a detected or previously stored fingerprint can be output to a display screen if desired for visual inspection.

The protective coating 34 described above can be employed with various configurations of sensing elements and sensing circuitry. The inclusion of conductive particles in a thin polymeric coating is particularly useful in capacitive fingerprint sensors, as described herein. From the foregoing description, those skilled in the art will envision other applications of the basic inventive concept. Although preferred embodiments have been described in detail, it should be understood that various changes, substitutions and alterations can be made therein without departing from the spirit and scope of the invention as defined by the appended claims.

What is claimed is:

1. A sensor device, comprising:
   a semiconductor substrate;
   a dielectric body disposed on the substrate and having a flat upper surface;
   an array of sensing elements formed in the dielectric body proximate to its upper surface; and
   a protective coating disposed on the upper surface of the dielectric body over the sensing elements, the protective coating having a flat upper surface defining a sensing surface of the device, the protective coating comprising a fluoropolymer and having a conductive particles suspended therein, the conductive particles being distributed within the protective coating to define parallel strings of series capacitors between the sensing surface and each sensing element therebelow.

2. The sensor device of claim 1 wherein each sensing element is a capacitive sensing element having a capacitor plate disposed at the upper surface of the dielectric body.

3. The sensor device of claim 1 wherein the fluoropolymer protective coating comprises fluorinated ethylene propylene.

4. The sensor device of claim 3 wherein the protective coating is from 10 to 20 microns thick.

5. The sensor device of claim 3 wherein the conductive particles comprise conductive material selected from the group consisting of carbon, graphite, silicon, aluminum, copper, and silver.

6. A fingerprint sensor device, comprising:
an array of capacitive sensing elements, each element having capacitor plate defining one plate of a variable capacitor;
a protective coating disposed over the capacitor plate, the protective coating having an upper sensing surface for contact by the fingerprint-bearing skin of a user's finger;
the protective coating comprising a fluoropolymer having conductive particles suspended therein, the protective coating having a uniform thickness, the majority of the conductive particles having a largest dimension that is less than half the thickness of the protective coating; and
the conductive particles being distributed with sufficient density within the protective coating to define parallel strings of series capacitors between the upper sensing surface and each capacitor plate therebelow.

7. The fingerprint sensor device of claim 6 wherein the majority of the conductive particles have largest dimensions that are from one-quarter to one-third the thickness of the protective coating.

8. The fingerprint sensor device of claim 7 wherein the thickness of the protective coating is from 10 to 20 microns.

9. The fingerprint sensor device of claim 6 wherein the conductive particles suspended in the fluoropolymer protective coating are carbon black particles.

10. The fingerprint sensor device of claim 6 wherein the polymeric material comprises fluorinated ethylene propylene.

11. The fingerprint sensor device of claim 6 wherein the conductive particles are generally spherically shaped.

12. The fingerprint sensor device of claim 6 wherein the conductive particles comprise conductive material selected from the group consisting of carbon, graphite, silicon, aluminum, copper, and silver.

13. The fingerprint sensor device of claim 6 further comprising a thin polymeric layer interposed between the protective coating and the capacitor plates of the sensing elements, the thin polymeric layer being less than 2 microns thick.

14. A fingerprint sensor device for sensing the fingerprint-bearing skin of a user's finger and generating digitized signals from which an image of the fingerprint can be created, the device comprising:
a semiconductor substrate;
a plurality of pixels formed at locations above the substrate, the pixels being uniformly spaced apart by a predetermined center-to-center spacing;
a dielectric body disposed on the substrate and having an upper surface, the dielectric body having capacitor plates embedded therein, the capacitor plates including upper capacitor plates lying at the upper surface, each upper capacitor plate corresponding to a pixel location and defining a portion of a capacitive sensing stage for each pixel;
active circuitry formed in the substrate including an amplifier stage for each pixel, each amplifier stage connected to its pixel's capacitive sensing stage for generating an amplified output signal that is a function of a fingerprint characteristic that occurs at the respective pixel when a user's finger is applied to the device; and
a protective coating comprising a fluoropolymer disposed over the dielectric body, the protective coating having a uniform thickness and including a plurality of conductive particles distributed therein, the protective coating having an upper surface defining a sensing surface of the device to which the fingerprint-bearing skin of a user's finger is applied during a sensing operation, the sizes of a majority of the conductive particles being less than one-half the thickness of the protective coating, the density of the conductive particles within the protective coating being sufficiently large to create capacitors within the protective coating at each pixel location of the device to couple the capacitance defined by the user's skin applied to the sensing surface to the pixel's capacitive sensing stage therebelow.

15. The fingerprint sensor device of claim 14 wherein the capacitive sensing stage of each pixel includes first and second capacitors connected in series, the first and second capacitors being defined by the upper capacitor plate and respective first and second lower plates embedded in the dielectric body beneath the upper plate, the upper capacitor plate defining a common node of the series first and second capacitors, the upper capacitor plate and the conductive particles thereover defining a sensing capacitor whose capacitance varies with the fingerprint characteristics of the user's finger applied to the sensing surface thereover at the respective pixel location.

16. The fingerprint sensor device of claim 14 wherein the thickness of the protective coating is less than one-half the center-to-center pixel spacing.

17. The fingerprint sensor device of claim 16 wherein the thickness of the protective coating is from 10 to 20 microns.

18. The fingerprint sensor device of claim 16 wherein at least 90 percent of the conductive particles have largest dimensions that are from one-quarter to one-third the thickness of the protective coating.

19. The fingerprint sensor device of claim 14 wherein the protective coating comprises fluorinated ethylene propylene.

20. The fingerprint sensor device of claim 14 wherein the conductive particles have conductive cores covered by a thin outer dielectric coating.

21. An integrated circuit device, comprising:
a semiconductor substrate;
active circuitry formed on the substrate;
a dielectric body disposed above the substrate;
conductors formed in the dielectric body and interconnected with the active circuitry; and
a protective coating disposed over the dielectric body, the protective coating comprising a fluoropolymer and having multiple conductive particles suspended therein, the conductive particles being disposed throughout the protecting coating, the protective coating having a continuously flat upper surface overlying multiple conductors at different levels in the underlying dielectric body.

22. The integrated circuit device of claim 21 wherein the fluoropolymer is a fluorinated ethylene propylene.

23. The integrated circuit device of claim 22 wherein the conductive particles are generally spherically shaped.

24. The integrated circuit device of claim 23 wherein the conductive particles comprise balls having metal cores with thin exterior dielectric coatings.

25. The integrated circuit device of claim 23 wherein the conductive particles have diameters that are about one-third the thickness of the protective coating.

26. The integrated circuit device of claim 22 wherein conductive particles comprise non-metallic conductive material densely packed within the protective coating.

27. The integrated circuit device of claim 26 wherein more than 90 percent of the conductive particles are sized such that their largest dimension is from one-fourth to one-third of the thickness of the protective coating.

28. The integrated circuit device of claim 22 wherein the protective coating is from 10 to 20 microns thick.

29. The integrated circuit device of claim 28 wherein the conductive particles comprise conductive material selected from the group consisting of carbon, graphite, silicon, aluminum, copper, and silver.

30. The integrated circuit device of claim 28 further comprising a thin polymeric layer interposed between the protective coating and the dielectric body, the thin polymeric layer being less than 2 microns thick.

* * * * *